Patented May 17, 1927.

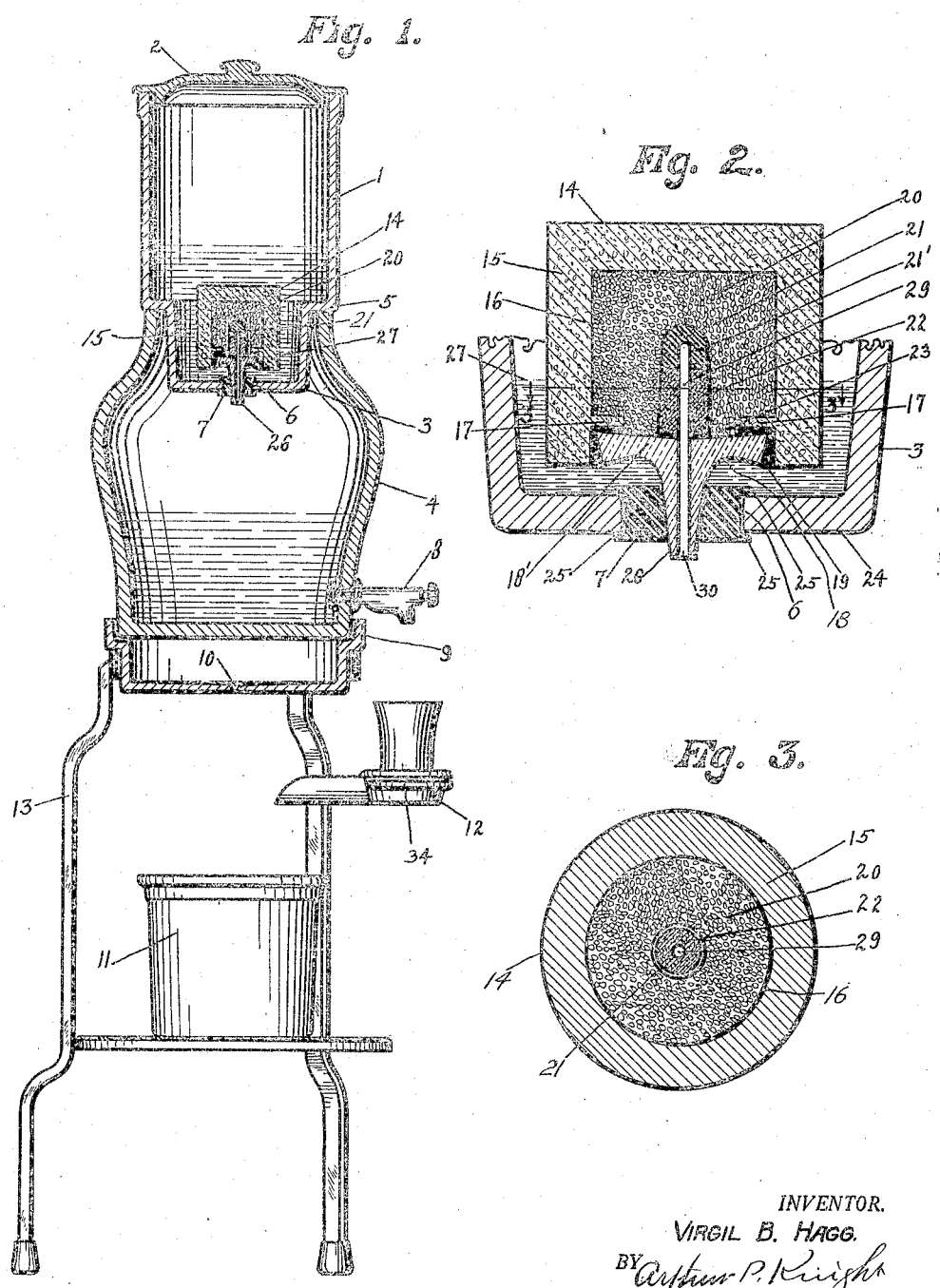

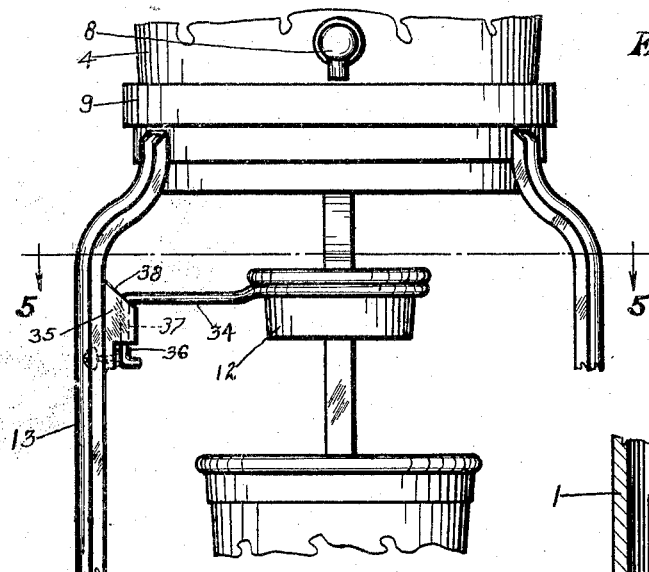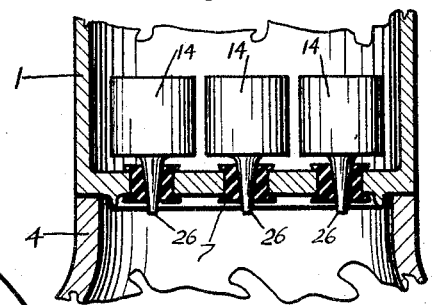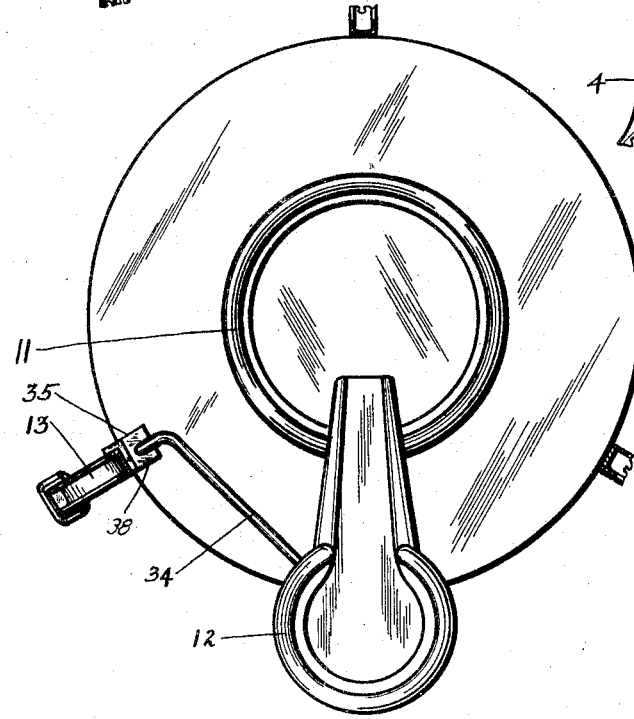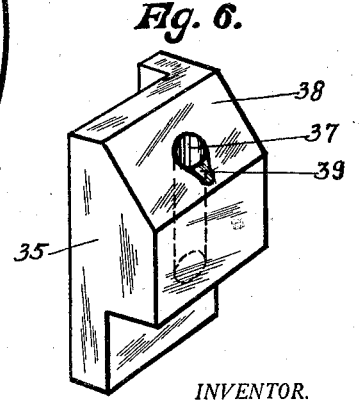

1,629,269

UNITED STATES PATENT OFFICE.

VIRGIL B. HAGG, OF WEST HOLLYWOOD, CALIFORNIA.

WATER FILTER.

Application filed October 7, 1925. Serial No. 61,007.

My invention relates to filters for removing impurities from liquids and particularly for the purification of water for household uses. The principal object is to provide a filter of simple and economical construction in which the water is subjected to a very thorough oxidational action after preliminary filtration.

A further object is to provide a filter in which the filter unit may be readily removed and reinserted so that it may be taken out from time to time and cleaned which is essential to the long life and proper operation of such a filter. A further object of the invention is to provide a removable filter unit which may be removed and cleaned without contact of the hands with the portions of the filter which subsequently receive or come in contact with the filtered water.

A further object is to utilize one or more kinds of filtering material of different degrees of permeability in the direction of flow of the liquid being filtered, in such manner as to protect the coarser granulated material used for oxidational purposes, also preventing impurities of a suspended physical nature from entering its pores, thereby prolonging the life of said oxidizing material.

A further object of the invention is to provide for complete drainage of liquid from the filter unit, and particularly from the granular oxidizing material, after each filtering operation, so as to permit access of air thereto and maintain such material in a highly active condition.

Other objects will be in part obvious and in part pointed out hereinafter.

Water filters wherein the filtering material consists of porous materials such as silicates sandstone, kieselguhr, asbestos, and similar substances, also granular materials as charcoal, coke, and the like, have long been known. In this type of filter the superficial area of the filtering surface is small as compared to the quantity of water to be filtered. Therefore it is of the utmost importance that the exterior surface of the filtering material be kept in a clean, sanitary condition to obtain the maximum efficiency. The filtering surface must be readily accessible so as to remove the accumulated matter it has strained, else the pores will soon become clogged and the filter will cease to work.

Numerous attempts to manufacture filters of simple design to enable persons of inexperience to readily clean them have been only partially or temporarily successful. As an example, some filters are so constructed that the bottom of the receiving reservoir consists of a porous filter-stone disc permanently cemented to the wall of the jar, thus forming a porous bottom. This method has proved to be an unhandy method of construction as it is very difficult to renew the filter-disc when its life has been exhausted by the frequent cleaning and wearing away of the filter wall. The reason for this inconvenience is that the cement used to unite the disc to the jar is extremely hard and very frequently necessitates the use of a chisel and hammer to remove the worn out portion, thus endangering the breaking of the stone-ware jar. Another objection is the inconvenience of cleaning, owing to the combined weight of the upper reservoir and the water soaked filter-disc. The weight of the filter jar makes it quite cumbersome for children or physically disabled persons to clean the filter properly without considerable risk. These objections are quite perceptible and no doubt account for the fact that such filters have never met with universal public approbation.

I am also aware that various types of porous filter cylinders, blocks and the like have been invented, but I find in the majority of cases where they are temporarily attached to the reservoirs or filtering chambers, by means of threaded bolts, nuts or clamps, that the metal parts soon corrode and it is oftentimes hard to loosen the parts for the purpose of removing the filter block in order to clean it. This nearly always occurs where the filter has been reglected for any length of time. Where the corrosion is very bad it becomes necessary to break the filter block in order to remove the parts.

The present invention by which these objections are overcome and the above objects accomplished comprises a chamber for receiving liquid, a storage chamber for filtered liquid below said receiving chamber and a filter unit removably inserted between said chambers and comprising an outer filtering wall of porous mineral material, a body of oxidizing agent inside said outer wall and a porous retaining member within said body of oxidizing material and having its upper portion of greater porosity than its lower portion and provided at its center with liquid outlet means communicating with the lower chamber.

The accompanying drawings illustrate embodiments of my invention, and referring thereto:

Fig. 1 is a vertical mid-sectional view of the entire filter.

Fig. 2 is an enlarged vertical sectional view of the filter unit and adjacent portions of the filter.

Fig. 3 is a horizontal section on line 3—3 in Fig. 2.

Fig. 4 is a partial front elevation of the drain dish and adjacent parts of the filter.

Fig. 5 is a horizontal section on line 5—5 in Fig. 4.

Fig. 6 is a perspective view of the member on which the drain dish bracket is mounted.

Fig. 7 is a partial vertical section of a filter provided with a plurality of filter units acting in parallel.

As indicated in Fig. 1, a receiving vessel 1 is provided for holding the liquid to be filtered. This vessel has a suitable cover 2. The lower portion 3 of said receiving vessel or reservoir 1 preferably projects down into the mouth of the storage chamber or reservoir 4, a shoulder 5 being preferably provided as a means of support. The projection of this vessel or jar into the lower chamber is not absolutely essential for the successful operation of the filter, but such an arrangement improves the appearance of the completed filter, by apparently shortening the top jar. The receiving vessel 1 has a hole 6 in the bottom within which is fitted the rubber bushing 7. The latter is normally of slightly larger diameter than the hole 6, in order to allow the bushing to expand when in position as indicated at 25, and thus cause a water tight connection.

The storage reservoir 4 is preferably slightly porous, enough to permit slow seepage and evaporation from the exterior surface in order to cool the contents. This is standard practice and long known. A faucet 8 is provided for drawing off the filtered water as desired. A collecting base 9 drains off through the hole 10, any excess seepage from reservoir 4. A vessel 11 may be provided for collecting the drained off seepage which can be emptied as the occasion requires. A drain dish 12 collects any drip from the faucet and also acts as a place to set a drinking glass. A portable stand 13 supports the entire filter.

The filter unit 14 is placed between the upper receiving vessel or jar 1 and the lower vessel or storage reservoir 4 so that all the water in flowing from the upper to the lower vessel must pass through such filter unit. Said filter unit is shown in more detail in Fig. 2 and referring thereto the exterior wall 15 of such unit is porous and can be made of either natural or artificial stone of suitable porosity and possessing certain filtering qualities. Said filter unit may as shown comprise a top wall and a cylindrical side wall and may be provided with a cylindrical interior recess or chamber 16 but any other desired shape of wall and chamber may be used without departing from the spirit of the invention. An inwardly projecting shoulder 17 may be provided below which is secured a porcelain outlet member 18, said outlet member having a disc-shaped base portion 18' fitting within wall 15 and below the shoulder 17 and a tubular portion 26 projecting through the central opening of rubber bushing 7. When the unit is in assembled condition the base portion 18' of outlet member 18 is permanently attached to the filter wall by means of cement indicated at 19.

A body of granular filtering and purifying material 20 is placed within recess 16, said filtering material consisting for example of refined charcoal or the like. In the center of said body of filtering material is placed a porous cylindrical inverted cup or thimble 21 which is permanently fastened to the outlet member 18 by means of cement 23. The upper portion 21' of cup 21 consists of material having a relatively coarse porosity while the lower portion 22 of such cup is of relatively fine porosity, the object being to retard the exit of the water through the portion 22 in order that it will rise to a higher level and make a rapid exit through the coarser porous material in the upper part 21'. Portions 21' and 22 of cup 21 may be composed of natural or artificial stone or stone ware having different porosities. Cup 21 is provided with a central passage 29 which communicates with a central passage 30 extending through the tubular portion 26 of outlet member 18. Said outlet member is fitted tightly within bushing 7 and said bushing is slightly larger in diameter than the hole 6 so that after insertion therein the rubber expands as at 25 to form a perfectly water-tight connection. Tubular portion 26 is preferably tapering as shown so that the natural wear of the rubber bushing may be compensated for by inserting such tapering portion further therein thus ensuring a water-tight joint at all times. The rubber bushing is always submerged under water when the filter is in use thus prolonging its life as water is a natural preservative of rubber and prevents its deterioration to a remarkable degree.

The filtering process is as follows:

The unfiltered water is poured into the top reservoir or chamber 1 as indicated at 27 and gradually seeps through the filter wall 15 which mechanically removes all suspended impurities. The water is nearly pure after making its exit through filter wall 15 but is subjected to a further purification in passing through the granular charcoal 20, which absorbs or adsorbs or otherwise acts on gases contained in the water and gives the water a brighter color and eliminates substances that cause objectionable color, odor, or taste.

The flow is relatively slow through the lower portion 22 of thimble 21 which causes the water to rise until it reaches the upper rapid exit portion 21' which has very coarse pores. The purified water now passes down the central passage 29 of thimble 21 and out through the opening 30 of the outlet member 18 into storage reservoir 4. By retarding the exit of the water through the lower portion 22 a prolonged action and a maximum time of contact of the water with the charcoal is ensured by having the main exit of the water at approximately the center of the granulated filter material 20. This is one of the principal objects of the invention, that is to cause the water to have a prolonged contact with the oxidizing material 20 and thus ensure the greatest possible purifying effect on the water.

The object of the lower portion 22 being partially porous is to permit complete drainage of the entire filter unit 14 which is very necessary with types of filters using charcoal or a similar material for oxidizing purposes so as to permit access of air between filtering operations to all parts of such material. If the lower portion 22 were impervious or of vitreous construction a considerable portion of the water would be left standing in the filtering unit after the end of the filtering operation which would cause a stale taste in the water if left for any length of time and would also impair the efficiency of the oxidizing material. It will be seen therefore that during the greater part of the filtering operation the water is caused to rise in the body of granular oxidizing material 20 to a portion well above the bottom of such body of material and at approximately the mid-point thereof before passing off through the outlet opening 29. At the end of the filtering operation however, after the level of the water in the upper vessel 1 falls below this level as shown in Fig. 2, all of the water from the lower portion of the filter unit is permitted to drain slowly through the less porous portion 22. It is of vital importance that in any filter using oxidizing materials such as charcoal or the like the water should be allowed to drain off occasionally to permit the pores of such material to absorb new oxygen for it is well known that the efficiency of charcoal for this purpose depends upon its oxygen content. This is very important in filters that use a preliminary method of filtering the suspended matter from the water prior to coming into contact with the charcoal.

In my invention the water is first relieved of all suspended material by the porous wall 15 so that only water free from suspended matter comes into contact with the granular oxidizing material 20, thus preventing clogging of the pores of such oxidizing material and consequent loss in efficiency thereof. One purpose of the granular material is to absorb or adsorb gases which are held in chemical solution in the water, which gases are afterward liberated when all the water has drained off from the filter unit. Another effect of the charcoal is to promote oxidation of certain impurities contained in the water. Coloring matters are also adsorbed or destroyed by the charcoal. After the upper reservoir 1 and the filter unit are empty, air is permitted to pass through the pores of the filter wall 15 and through the body of granular purifying material 20 so as to gradually remove absorbed gases from the charcoal and restore the oxygen content thereof. In filters where the charcoal or other granular oxidizing material is used for filtering as well as oxidizing action it is usually found necessary to make provision for the frequent removal of such material due to clogging of the pores by suspended matter and gradual deterioration thereby. This is a source of trouble as well as lessening the efficiency of the oxidizing material and the elimination of these objections is one of the important objects of this invention. According to my invention the suspended particles of dirt, etc., removed from the water collect at or near the outer surface of the porous wall 15, and it is only necessary to occasionally remove the filter unit, wash it thoroughly to remove such impurities, and reinsert it. At such times it is preferable to first lift off the upper jar 1 and pour out the remaining water from the bottom thereof before removing the filter unit therefrom and to wash the inside of the jar at the same time. I am aware that the combination of artificial or natural porous stone and charcoal has been used before but so far as I am aware such materials have not been used in the novel manner herein described.

In filter units of this type I have found it to be objectionable to retain the granular material 20 in position by means of screens or perforated pipes and I therefore find it advantageous to use a more finely porous means for this purpose, such as the porous inverted cup 21. The reason for this is that when the filter unit is carried or shipped the granules of charcoal rub together and a fine dust-like powder is loosened therefrom and when the unit is thereafter put in operation this dust passes along with the filtered water into the storage reservoir. This dust imparts a charcoal taste to the filtrate and destroys the clarity of the water and while it is not considered detrimental to the health it is somewhat objectionable for the above reasons. According to my invention in which the porous stone or stone-ware cup 21 is used to retain the charcoal it is practical to use very finely granulated material with no danger of any of the finer particles passing through with the water.

The drain dish 12 is, as stated above, for the purpose of holding a glass and catching the drip from the faucet 8. Heretofore with filter or cooler stands of almost every kind it has been difficult to get a pitcher or decanter under the faucet to draw off water, on account of the drain dish being in the way. In order to fill a pitcher or decanter it is necessary to tip the same quite appreciably, which is quite inconvenient. According to my invention the drain dish is movably mounted, for example, by a bracket arm 34 pivoted to swing horizontally on a fixed casting or mounting member 35, fastened to the stand 13, said bracket arm having a vertical pivot portion 36 engaging in a vertical socket 37 in member 35 and the bracket arm riding up on an inclined face 38 on said member when the bracket is pushed back, so as to permit a vessel to be introduced under the faucet; and so that when the vessel is withdrawn, the bracket arm will automatically move back by the action of gravity, to return the disk to its normal position, the arm 34 falling into a notch or groove 39 in line with the upper end of socket 37 to hold the same in normal position until it is forcibly removed therefrom by pressure of the said vessel against the dish 12. It will be noted that it is not necessary to touch the dish 12 with the hands, it being sufficient to press the water receiving vessel against the dish. This feature of my invention may be applied not only in connection with water filters, but also with any other water dispensing devices, such as coolers, etc. Furthermore, I do not wish to be limited to the exact means above described for permitting the drain dish to be moved out of the way or for causing it to automatically be returned to normal position beneath the faucet, as it is obvious that many other means could be used for this purpose, for example spring-return means, and my invention should be understood to include the use of any of such means.

Any desired number of the filter units 14 may be placed between the upper chamber 1 and lower chamber 4. For example, in Fig. 7 I have shown three of such units placed side by side, each having its outlet tube 26 inserted in a separate rubber bushing 7. With such an arrangement the water flows in parallel through all the filter units, giving a filter of greater capacity. In either of the forms of the invention shown, the filter unit or units may not only be readily removed, cleaned, and re-inserted at regular intervals in order to prevent clogging of the surface of filter wall 15, but may be replaced by new units when necessary due to deterioration, after long-continued use, of the granular oxidizing material or for any other reason. This is a point of improvement over the former type of filter above referred to, in which the filter member consisted of a porous disk or plate permanently cemented in the bottom of the water receiving jar.

I claim:

1. A filter comprising a water receptacle, a filter element within said receptacle in position to be entirely surrounded by the water therein, said filter element comprising an outer wall of porous stone and having an internal chamber separated from said receptacle by said outer wall, a body of granular purifying material in said chamber, an inverted thimble of porous mineral material in the central portion of said chamber and having a central passage opening downwardly to permit exit of water therethrough, the lower portion of said thimble being more finely porous than the upper portion, and means below said filter element for receiving the water passing therethrough.

2. A filter unit for water filters, comprising an outer wall of porous stone having a top portion, a cylindrical side portion, and a shoulder portion formed integrally with said side portion and projecting inwardly therefrom near the bottom thereof, said side portion of the wall extending downwardly below said inwardly projecting shoulder; an outlet member having a base portion fitting within said side portion and below said shoulder, said outlet member being provided with a central outlet passage extending vertically therethrough; means securing the base portion of said outlet member to said side portion and said shoulder; a thimble of porous material within said outer wall and above said outlet member and having a passage communicating with said outlet passage; and a body of granular purifying material within said outer wall and around said thimble.

3. A filter unit as set forth in claim 2, the lower portion of said thimble being more finely porous than the upper portion.

In testimony whereof I have hereunto subscribed my name this 25th day of September, 1925.

VIRGIL B. HAGG.